US 11,882,175 B2

(12) United States Patent
Dutta et al.

(10) Patent No.: US 11,882,175 B2
(45) Date of Patent: Jan. 23, 2024

(54) CORRELATIONS BETWEEN WORKLOAD CHARACTERISTICS AND ELAPSED TIMES

(71) Applicant: Hewlett Packard Enterprise Development LP, Houston, TX (US)

(72) Inventors: Mayukh Dutta, Karnataka (IN); Manoj Srivatsav, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/649,993

(22) Filed: Feb. 4, 2022

(65) Prior Publication Data
US 2023/0199060 A1 Jun. 22, 2023

(30) Foreign Application Priority Data
Dec. 17, 2021 (IN) .............................. 202141059108

(51) Int. Cl.
| G06N 3/045 | (2023.01) |
| H04L 67/1008 | (2022.01) |
| H04L 67/1027 | (2022.01) |
| H04L 67/1029 | (2022.01) |
| G06F 11/34 | (2006.01) |

(52) U.S. Cl.
CPC ...... *H04L 67/1008* (2013.01); *G06F 11/3428* (2013.01); *G06N 3/045* (2023.01); *H04L 67/1027* (2013.01); *H04L 67/1029* (2013.01)

(58) Field of Classification Search
CPC ............. H04L 67/1008; H04L 67/1027; H04L 67/1029; G06N 3/045; G06F 11/3428
See application file for complete search history.

(56) References Cited

U.S. PATENT DOCUMENTS

| 5,664,106 | A | 9/1997 | Caccavale |
| 9,384,227 | B1 | 7/2016 | Xiao et al. |
| 9,507,887 | B1 | 11/2016 | Wang et al. |
| 9,665,288 | B1 | 5/2017 | Aharoni et al. |
| 9,753,987 | B1 | 9/2017 | Dolan et al. |
| 9,983,795 | B1 | 5/2018 | Naamad et al. |
| 10,339,455 | B1 | 7/2019 | Parush-Tzur et al. |
| 10,671,431 | B1 | 6/2020 | Dolan et al. |
| 2015/0149508 | A1 | 5/2015 | Luo et al. |
| 2018/0123931 | A1 | 5/2018 | Sun et al. |

(Continued)

OTHER PUBLICATIONS

Yang et al. "Multi-step-ahead host load prediction using autoencoder and echo state networks in cloud computing", J Supercomput, 2015, pp. 3037-3053.*

(Continued)

*Primary Examiner* — Li Wu Chang
(74) *Attorney, Agent, or Firm* — Trop, Pruner & Hu, P.C.

(57) ABSTRACT

In some examples, a system receives a first collection of tokens relating to characteristics of workloads for a computing system. The system encodes the first collection of tokens, the encoding including computing weights representing relationships among tokens of the first collection of tokens, and generating a representation of the first collection of tokens based on the weights. The system determines, based on the representation, a correlation between the first collection of tokens and a second collection of tokens relating to elapsed times in executing the workloads.

19 Claims, 7 Drawing Sheets

(56) References Cited

U.S. PATENT DOCUMENTS

2019/0334801 A1* 10/2019 Dutta .................. H04L 41/0866
2020/0394073 A1    12/2020 Dutta et al.

OTHER PUBLICATIONS

Gao et al. "Workload Prediction of Cloud Workflow Based on Graph Neural Network", WISA, 2021, pp. 169-189.*

Narayanan et al. "Heterogeneity-Aware Cluster Scheduling Policies for Deep Learning Workloads", USENIX, 2020, pp. 19.*

Li et al. "Solving Open Shop Scheduling Problem via Graph Attention Neural Network", ICTAI, 2020, pp. 277-284.*

Aggarwal R., et al., "Common pitfalls in statistical analysis: The use of correlation techniques," Perspective in clinical Research, vol. 7, Issue 4, Oct. 2016, pp. 1-6.

Bahdanau, D., et al., "Neural Machine Translation by Jointly Learning to Align and Translate," ICLR 2015, May 19, 2016, pp. 15.

Cao, Y., et al., "Accuracy limitations and the measurement of errors in the stochastic simulation of chemically reacting systems," Journal of Computational Physics, 212 (2006), Aug. 18, 2005, pp. 6-24.

Chakraborttii, C., et al., "Learning I/O Access Patterns to Improve Prefetching in SSDs," Sep. 2020, pp. 16.

Cho, K., et al., "Learning Phrase Representations using RNN Encoder-Decoder for Statistical Machine Translation," Sep. 3, 2014, pp. 15.

Chuck, P., "Storage Performance Benchmarking Guidelines—Part I: Workload Design," SNAI Solid State Storage Initiative, May 2010, pp. 8.

Li, H., et al., "A novel clustering algorithm for time-series data based on precise correlation coefficient matching in the IoT," Mathematical Biosciences and Engineering, vol. 16, Issue 6, Jul. 19, 2019, MBE, 16(6), pp. 6654-6671.

Sutskever, I., et al., "Sequence to Sequence Learning with Neural Networks," Dec. 14, 2014, pp. 9.

Vaswani, A., et al., "Attention Is All You Need," 31st Conference on Neural Information Processing Systems (NIPS 2017), Dec. 6, 2017, pp. 15.

* cited by examiner

CORRELATIONS BETWEEN WORKLOAD CHARACTERISTICS AND ELAPSED TIMES

BACKGROUND

A storage system includes storage resources and other resources (including processing resources and communication resources) on which various different types of workloads can be performed. The different workloads can compete for the resources of the storage system.

BRIEF DESCRIPTION OF THE DRAWINGS

Some implementations of the present disclosure are described with respect to the following figures.

Figure 1:
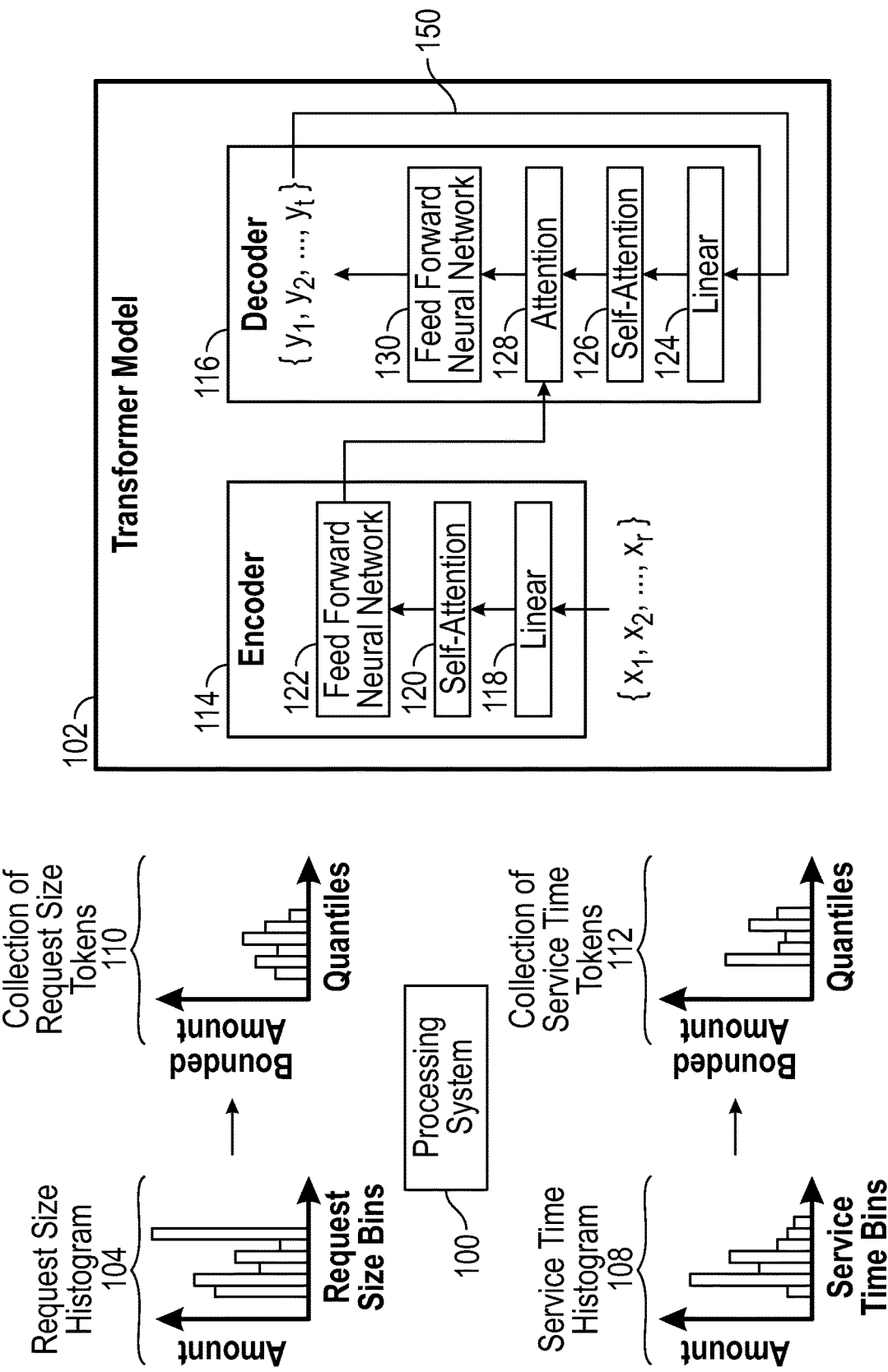
FIG. 1 is a block diagram of an arrangement that applies a transformer model on an input collection of tokens relating to workloads of the computing system to produce a second collection of tokens relating to elapsed time in executing the workloads, in accordance with some examples of the present disclosure.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

During operation of a storage system, data access requests can be received (such as from host systems) to access data stored by the storage system. The data access requests can include read requests and write requests, which cause performance of workloads in the storage system to obtain target results (e.g., read data from or write data to the storage system).

Storage performance benchmarking can be performed to characterize the performance of a storage system given expected workloads. A "workload" can refer to any collection of activities performed by an entity (e.g., machine-readable instructions, a virtual entity, a hardware component, etc.) in a computing environment, such as a storage system, a computer system, a network system, and so forth.

Although the ensuing discussion refers to examples that involve storage systems, it is noted that techniques or mechanisms according to some examples of the present disclosure can be applied with other types of systems, including computer systems, network systems, and so forth.

Estimating performance of storage systems for given workloads can assist an enterprise (e.g., a company, an educational organization, a government agency, an individual, etc.) in appropriately sizing a storage system, where "sizing" a storage system can refer to providing resources in the storage system to accommodate expected workloads. Examples of resources can include physical resources such as storage devices, processing resources (e.g., processors, cores of processors, etc.), communication resources (e.g., network interface controllers, switches, etc.), and so forth. Examples of storage devices can include disk-based storage devices, solid state storage devices, memory devices (e.g., dynamic random access memory (DRAM) devices, static random access memory (SRAM) devices, etc.), and so forth. Resources of a storage system can also include logical resources, such as virtual machines, virtual processors, virtual communication devices, and so forth.

Estimating the performance of a storage system may also be useful for evaluating whether the storage system is satisfying a target performance level, and/or whether anomalies are present. Anomalies can be caused by presence of malware or faults in hardware or machine-readable instructions. Estimating storage system performance can allow for an enterprise to determine whether the storage system performance has degraded or improved over time for given workloads. Benchmarking the storage system performance can also allow for a comparison to performance of storage systems in a given community, such as a global community, another enterprise, and so forth.

In some cases, to perform benchmarking, models may be created based on measured performance indicators, sometimes referred to as key performance indicators (KPIs). Examples of KPIs include an input/output (I/O) demand rate (e.g., I/O request size, number of requests per size, and so forth). Another KPI includes elapsed time (e.g., a service time to perform workloads of I/O requests, latencies associated with performing workloads of I/O requests, etc.). Accurate modeling relies upon measuring the KPIs at a high level of granularity (e.g., measured at relatively small time intervals or at many different locations of a storage system), which can place a relatively large burden on the resources of the storage system that would take away from the ability of the storage system to service actual workloads.

In some cases, to reduce the quantity of measured KPIs, a storage system may sample KPIs, where the KPIs are measured during specified sampling intervals. In some examples, sampled I/O demand rate measurements and sampled elapsed time measurements can be collected into histograms. A histogram includes multiple bins. For example, if the I/O demand rate is expressed as an I/O request size, then the different bins of an I/O demand rate histogram can correspond to different I/O request sizes. For example, read requests can read data of different sizes (i.e., different amounts of data), such as 512-byte (512B) data, 1k-byte (1 kB) data, 2 kB data, and so forth. These different I/O request sizes correspond to different bins of the I/O request size histogram. Each bin is assigned an "amount value" that represents an amount of occurrence of corresponding I/O request sizes. For example, an amount value for the 512B bin of the I/O request size histogram can have a value that represents the amount of occurrences of 512B I/O requests. The amount of occurrence of an I/O request of a given size can be represented as a quantity (count) of I/O requests of the given size, a frequency of occurrence of I/O requests of the given size (count per unit time), a percentage that represents a ratio of I/O requests of the given size to a total quantity of I/O requests, or any other indication of how many I/O requests of the given size has been encountered in the storage system.

Similarly, the elapsed time histogram has bins corresponding to different elapsed times for performing workloads of I/O requests, and each bin is assigned a value that represents an amount of occurrence of the respective elapsed time for performing workloads of I/O requests.

Although such histograms may help understand a distribution of I/O requests of different sizes and a distribution of elapsed times for performing workloads of I/O requests over a time duration (i.e., the same time duration), the histograms do not provide insight into which I/O request sizes contributed to which elapsed times.

A challenge associated with obtaining the insight into which I/O request sizes contributed to which elapsed times is that the I/O demand rate histogram and the time elapsed histogram have values that are taken from different domains. Also, there is no positional alignment between the histograms (e.g., no alignment exists between buckets of the I/O demand rate histogram and buckets of the time elapsed histogram), and there is no monotonic relationship between the histograms. Instead, a complex relationship may exist between the histograms.

In accordance with some examples of the present disclosure, an alignment can be determined between an I/O demand rate histogram and an elapsed time histogram to allow for a correlation between specific bins of the I/O demand rate histogram and respective bins of the elapsed time histogram. The determined alignment provides information indicating a relationship between each I/O demand rate characteristic (e.g., I/O request size) and each respective elapsed time, for example.

Although examples refer to use of I/O demand rate histograms and elapsed time histograms, in other examples, alignments can be determined based on other collections of values obtained from different domains of a computing environment, such as a storage system, a computer system, a network system, and so forth.

1. Transformer Model

FIG. 1 shows an example arrangement that includes a transformer model 102 according to some implementations of the present disclosure. The transformer model 102 is used to determine an alignment between characteristics of workloads (e.g., I/O demand rate characteristics such as I/O request sizes and number of requests per size) and elapsed times for performing the workloads of I/O requests.

The workloads are executed in a storage system, which may include various resources on which the workloads are performed. In some examples, a storage system can include a collection of storage volumes (a single storage volume or multiple storage volumes), where a storage volume refers to a logical partition of storage of data.

More generally, the transformer model 102 can be used for workloads executed in other types of computing environments.

FIG. 1 shows an example request size histogram 104 and a service time histogram 108. The bins of the request size histogram 104 are represented along the horizontal axis, with each bin representing a respective different I/O request size. Similarly, the bins of the service time histogram 108 are represented by the horizontal axis, with each bin representing a respective different service time. A "service time" can refer to an amount of time taken to service an I/O request (or multiple I/O requests).

The vertical axis of the request size histogram 104 represents an amount (a count, a frequency, a percentage, etc.) of occurrence of an I/O request size in each of the bins, and the vertical axis of the service time histogram 108 represents an amount of occurrence of a service time in each of the bins.

The amount values represented by the vertical axis of each of the request size histogram 104 and the service time histogram 108 are continuous values that can have a relatively large unbounded range. For use with the transformer model 102, each of the request size histogram 104 and the service time histogram 108 can first be converted by a processing system 100 to a respective collection of the discrete values, represented as a collection of request size tokens 110 and a collection of service time tokens 112.

A "processing system" can refer to a collection of computers (a single computer or multiple computers) that can execute machine-readable instructions. In some examples, the transformer model 102 can be trained and executed by the processing system 100. In other examples, the transformer model 102 can be built and trained by the processing system 100, and the trained transformer model 102 can be deployed on another processing system.

In examples according to FIG. 1, the horizontal axis of each of the collection of request size tokens 110 and the collection of service size tokens 112 are expressed as quantiles. Moreover, the vertical axis of each of the collections 110 and 112 are representative using bounded amount values. Bounded amount values include amount values between a lower bound and an upper bound. In this manner, the transformer model 102 is applied to bounded collections of values for better computational efficiency and accuracy.

Details regarding how the collections 110 and 112 with bounded values are derived are discussed further below.

The collection of request size tokens 110 (represented as $x_1, x_2, \ldots, x_r$ in FIG. 1, where r 2) can be an input to the transformer model 102. The collection of service size tokens 112 (represented as $y_1, y_2, \ldots, y_t$ in FIG. 1, where t≥2, and where r and t can be the same or different) is output by the transformer model 102.

The service time tokens ($y_1, y_2, \ldots, y_t$) are output tokens computed by the transformer model 102 one at a time. Note that in accordance with some examples of the present disclosure, as each service time token ($y_j$ where j=1, ... t) is generated by the transformer model 102, the generated service time token ($y_j$) is provided as a feedback input (150 in FIG. 1) to the transformer model 102 to assist in generating the next service time token.

The transformer model 102 is devised for estimating a service time histogram (or more specifically, the collection of service time tokens 112) given just the request size histogram (or another I/O demand rate histogram or a different histogram relating to characteristics of workloads) for a specific storage system. In some examples, different transformer models 102 can be built for different storage systems (e.g., storage systems with different resources).

The following discussion refers to examples with read workloads. More generally, the transformer model 102 can be applied to write workloads, or workloads that include both read and write operations.

Figure 2:
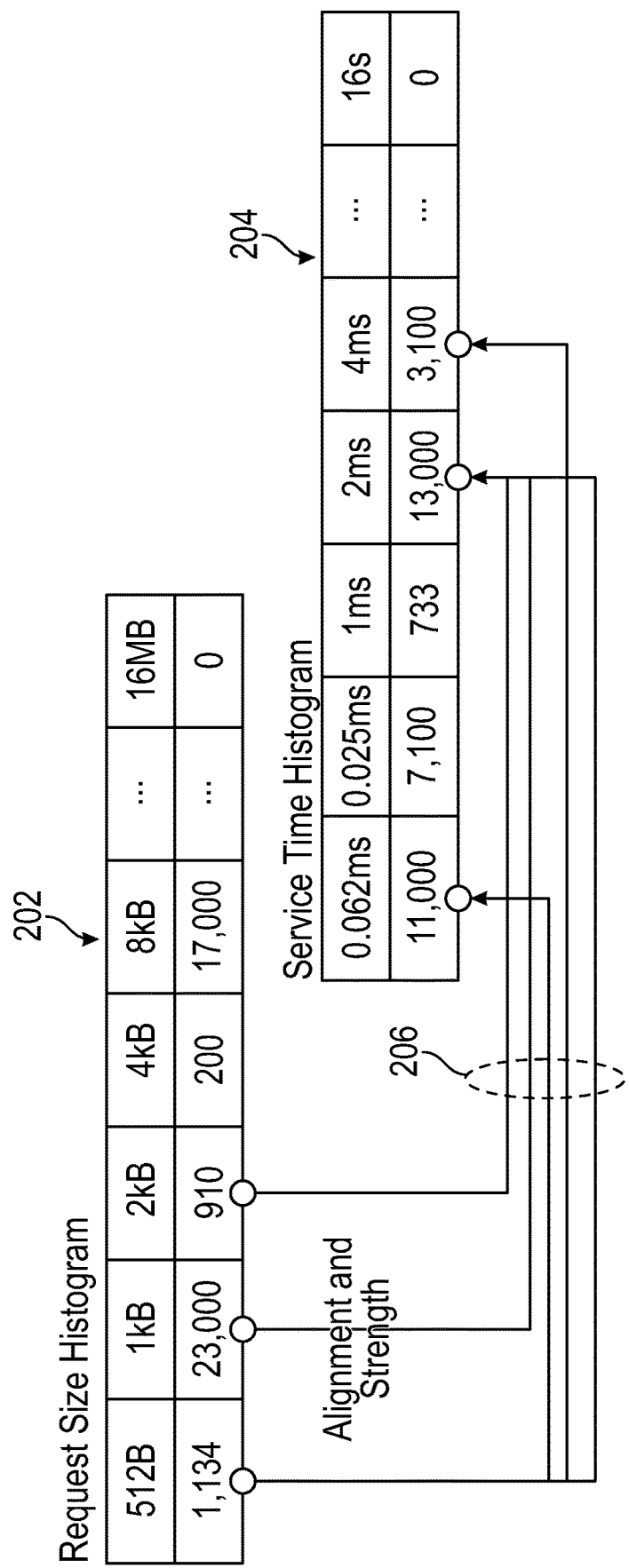
FIG. 2 is a block diagram showing relationships being a first histogram relating to characteristics of requests that produce workloads and a second histogram relating to elapsed times in executing the workloads, in accordance with some examples.

In some examples, the transformer model 102 is able to determine, given a storage system and its I/O demand rate and service time distributions represented by respective histograms, how the service times in the service time histograms are distributed among read request sizes in the I/O demand rate histogram, and vice versa. FIG. 2 shows an example request size histogram 202 and a service time histogram 204. In the specific example of FIG. 2, the request size histogram 202 has M bins (M≥2) for respective different I/O request sizes (512B, 1 kB, 2 kB, . . . , 16 MB), and the service time histogram 204 has N bins (N≥2, where M and N can be the same or different) for respective different service times (e.g., 0.062 milliseconds (ms), 0.025 ms, . . . , 16 seconds (s)). Each bin has an amount value. Respective alignments between bins of the request size histogram 202 and bins of the service time histogram 204, and measures of the strengths of each respective alignment, are derived based on information produced by the transformer model 102, and are represented by lines 206 in FIG. 2 (but may be represented by other types of indicators). The alignments can indicate whether a bin in the request size histogram 202 has a relationship with a bin in the service time histogram 204, and the respective strengths can indicate a strength of the relationship (which, in the case of lines representing alignments, the strength can be indicated with a thickness, color, or any other property of a line). A relationship between a bin in the request size histogram 202 and a bin in the service time histogram 204 exists if an I/O request size represented by the bin in the request size histogram 202 contributed to a service time represented by the bin in the service time histogram 204.

In accordance with some examples of the present disclosure, the transformer model 102 can employ natural language processing techniques (e.g., used in machine translation between different languages), but applied to collections of tokens (e.g., 110 and 112) to perform alignment of the collections of tokens. The transformer model 102 is a form of a sequence-to-sequence model that takes a variable length sequence as an input and generates an output sequence. In some examples, "attention" techniques are applied in the transformer model 102 that does not rely on an input sequence having some type of temporal or other order. The attention techniques provide positional information of tokens, such as the collections of tokens 110 and 112 in FIG. 1.

The attention techniques are applied using attention logic in an encoder 114 and a decoder 116 of the transformer model 102. The encoder 114 includes a self-attention logic 120 applied to a transformed representation of $x_1, x_2, \ldots, x_r$ (the collection of request size tokens 110 in FIG. 1), and the decoder 116 includes a self-attention logic 126 applied to a transformed representation of $y_1, y_2, \ldots, y_t$ (the collection of service time tokens 112). The decoder 116 further includes an attention logic 128 applied to an output of the encoder 114 and the output of the self-attention logic 126 in the decoder 116.

Each of the encoder 114 and the decoder 116 can be implemented using hardware processing circuit(s), which can include any or some combination of a microprocessor, a core of a multi-core microprocessor, a microcontroller, a programmable integrated circuit, a programmable gate array, or another hardware processing circuit. Alternatively, each of the encoder 114 and the decoder 116 can be implemented using a combination of hardware processing circuit(s) and machine-readable instructions (software and/or firmware) executable on the hardware processing circuit(s).

Self-attention relates different positions of a single sequence (e.g., different tokens of a collection of tokens 110 or 112) to compute a representation of the sequence. For example, the self-attention logic 120 in the encoder 114 applies self-attention to input tokens relating to workloads in a storage system (e.g., the request size tokens of the collection 110), which encodes the input tokens to compute weights representing relationships among the input tokens, and generates a representation of the input tokens based on the weights. The representation of the input tokens relating to workloads can be in the form of output tokens.

The self-attention logic 124 in the decoder 116 applies self-attention to input tokens relating to service times (e.g., the service time tokens of the collection 112), which encodes the input tokens relating to service times to compute weights representing relationships among the input tokens relating to service times, and generates a representation of the input tokens relating to service times based on the weights computed by the self-attention logic 124. The representation of the input tokens relating to service times can be in the form of output tokens.

The attention logic 128 applies attention to output tokens produced by the encoder 114 and output tokens produced by the self-attention logic 126, to determine relationships (in the form of weights) between the output tokens produced by the encoder 114 and output tokens produced by the self-attention logic 126. These weights can be used to derive the alignment (e.g., as indicated by the lines 206 in FIG. 2) between workload characteristics (e.g., I/O request sizes) and service times.

The encoder 114 includes a linear logic 118, and the decoder 116 includes a linear logic 124. The linear logic 118 in the encoder 114 transforms the input collection of request size tokens $x_1, x_2, \ldots, x_r$ into a collection of internal vectors (each token $x_i$ where i=1 to r is transformed into a respective internal vector. A vector includes multiple elements. The linear logic 118 transforms each request size token into a respective internal vector that includes multiple elements (e.g., multiple numbers) that together represent the request size token.

Similarly, the linear logic 124 in the decoder 116 transforms the service time tokens $y_1, \ldots$ generated by the decoder 116 so far into respective internal vector(s). In some examples, each internal vector produced by the linear logic 118 or 124 is a fixed length internal vector.

The decoder 116 identifies a subset of the internal vectors produced in the encoder 114 that may be relevant to the generation of any positional value of the service time histogram, e.g., the amount value in the 2-ms service time bin of the service time histogram 204 in FIG. 2 may be driven by the amount values in the 2 kB, 1 kB and 512B bins of the request size histogram 202. The foregoing determines the alignment between collections of tokens from different domains.

Note that there may be a complex non-monotonic relationship between the collections of tokens (e.g., 110 and 112) from different domains, where each collection of tokens is not ordered (according to time or another order). In some examples, the encoder 114 and the decoder 116 do not employ any recurrent model.

As shown in FIG. 1, the encoder 114 further includes a feed forward neural network 122, and the decoder includes a feed forward neural network 130. The output of the feed forward neural network 130 is provided to produce an output from the decoder 116.

The various components (118, 120, and 122) of the encoder 114 can be implemented with a portion of the hardware processing circuit(s) of the encoder 114, or alternatively, can be implemented with machine-readable instructions executable by the hardware processing circuit(s) of the encoder 114. Similarly, the various components (124, 126, 128, and 130) of the decoder 116 can be implemented with a portion of the hardware processing circuit(s) of the decoder 116, or alternatively, can be implemented with machine-readable instructions executable by the hardware processing circuit(s) of the decoder 116.

In the encoder 114, the feed forward neural network 122 in the encoder 114 performs machine learning based on training data. The machine learning of the feed forward neural network 122 can be performed when the transformer model 102 is initially created, as well as iteratively as additional outputs are produced by the transformer model 102. Similarly, the feed forward neural network 130 in the decoder 116 performs machine learning based on training data. Initially, when the transformer model 102 is built, training data can be created that includes training collections of tokens (e.g., a training collection of request size tokens and a training collection of service time tokens). The training collections of tokens can be provided to the transformer model 102 for training of the transformer model 102. The training collections of tokens can be populated by a user or another entity. In some examples, the training collections of tokens can include random values or values from other sources, such as from a user or another entity. In some examples, the training collections of tokens can include a training collection of request size tokens and a training collection of service time tokens where the alignments between them are known, such as from a manual analysis or other analysis. In other examples, a training collection of request size tokens and a training collection of service time tokens can be used where the alignments between them are not known.

For example, the transformer model 102 can predict, based on the training collection of request size tokens, an output collection of service time tokens. A training process can compare the predicted output collection of service time tokens to the training collection of service time tokens, and determine how much error there is in the predicted output collection of service time tokens.

Multiple training iterations can be performed until a predicted output produced by the transformer model 102 has an error that is less than a specified error threshold. In each training iteration, each feed forward neural network 122 or 130 updates (learns) parameters of the transformer model 102 used in the encoder 114 and the decoder 116 so that the transformer model 102 starts to converge towards correct outputs (i.e., outputs with errors within the specified error threshold).

The parameters that are updated (learned) by the feed forward neural network 122 or 130 are discussed further below.

2. Transforming Inputs from Continuous Space to Discrete Space

In some examples, histograms containing unbounded continuous values (e.g., such as the request size histogram 104 and the service time histogram 108 of FIG. 1 that contains continuous values in their bins) are converted to collections of tokens with bounded, discrete values, such as the collection of request size tokens 110 and the collection of service time tokens 112 of FIG. 1. A "continuous value" refers to a value that is not restricted to a specific set of discrete values. For example, in a request size bin, an amount value can have any of various possible values (e.g., any of various count values, frequency values, percentage values, etc.).

The example discussed above refers to how the request size histogram 104 (with unbounded amount values) (FIG. 1) can be converted to the collection of request size tokens 110 (with bounded, discrete amount values).

The processing system 100 may sort amount values in the various bins of the request size histogram 104 in ascending order (or another order) and generate an array of the amount values. For example, the array of amount values derived from the request size histogram 104 is provided as follows: [10, 421, 0, 0, 4352, 0, 0, . . . , 987, 0, 5167, 2944], where each entry in the array corresponds to a request size represented by a bin of the histogram 104 (i.e., the array indicates 10 requests of size 512B, 421 requests of size 1 kB, etc.).

After sorting, a sorted array of amount values is provided as follows: [0, 0, 0, 0, 0, 0, 0, 10, 13, 30, . . . , 4352, 5167, 17438].

It is noted that in the foregoing example the amount values (obtained from the request size histogram 104) has a large (unbounded) variation with values ranging from a minimum value of 0 to a maximum value of 17438.

The processing system 100 can derive quantile ratios for implementing quantile cuts on the sorted array of amount values. In statistics, quantiles may be understood as points dividing a range of a distribution into segmented continuous intervals. A quantile point that defines an interval may be a point which divides the range based on the quantile ratio. For example, a 0.1 or 10% quantile ratio would be a point or value within a range of values defining the distribution below which 10% of the values within the distribution may lie. In a similar manner, a 0.9 or 90% quantile ratio would be a point or value within a range of values defining the distribution below which 90% of the values within the said distribution may lie.

In some examples, the quantile ratios may be equally distributed, for example "deciles" where the quantile ratios are defined as 0.1, 0.2, 0.3, . . . , 0.9, and 1.0, with each quantile ratio incrementing by a factor of 0.1. In other examples, the quantile ratios may be unequally defined, such as 0.1, . . . , 0.9, 0.92, 0.94, 0.998 and 1.0.

The manner in which the quantile cuts are implemented may be based on how the values within the sorted array of amount values are distributed. A large number of elements within a given range towards the end of a distribution may entail coarser quantile cuts earlier in the distribution and more granular cuts towards the end of the distribution.

Figure 3:
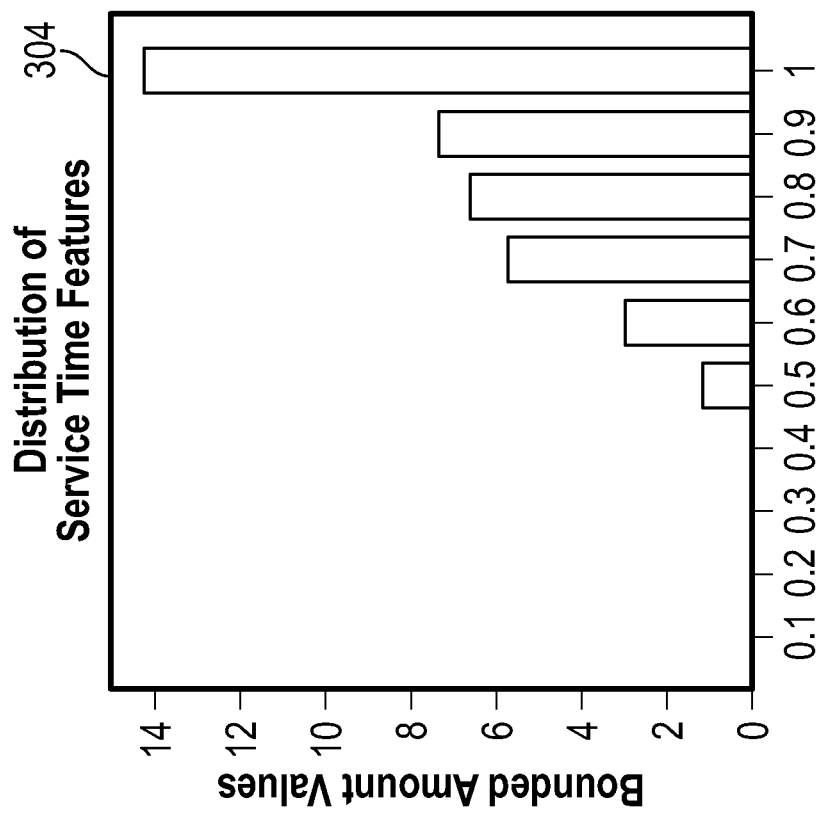
FIG. 3 are charts illustrating a distribution of request size features and a distribution of service time features, according to some examples.
Figure 3:
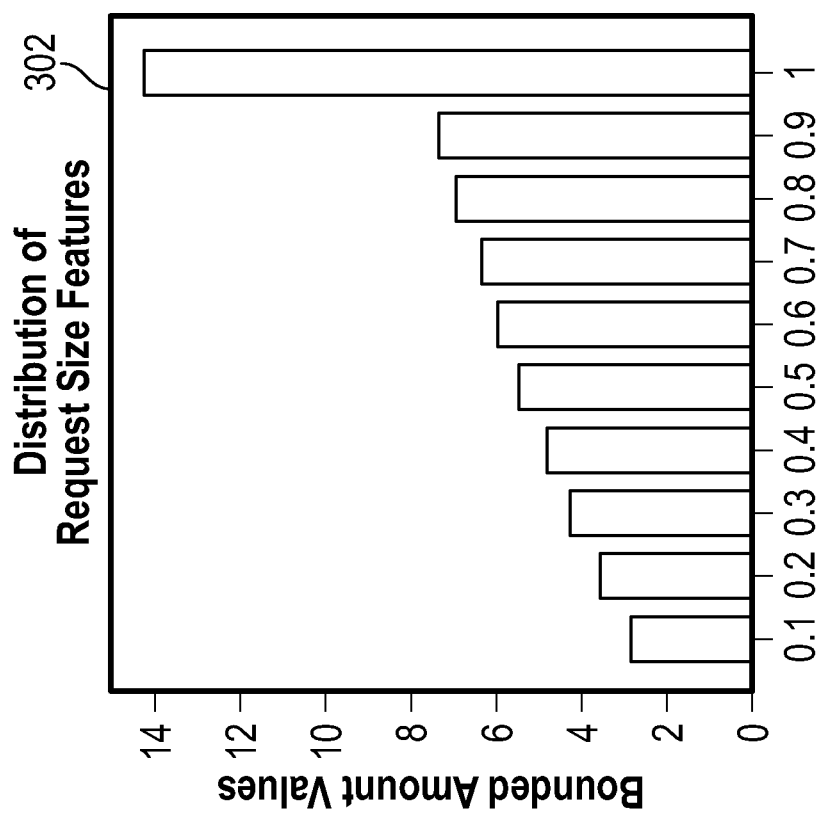

FIG. 3 shows an example of a distribution of request size features 302 divided into quantiles 0.1, 0.2, 0.3, . . . , 0.9, and 1.0, and a distribution of service time features 304 divided into quantiles 0.1, 0.2, 0.3, . . . , 0.9, and 1.0. Notice that a larger quantity of non-zero elements in the distribution of service time features 304 fall in the latter half of the quantiles, e.g., 0.5, 0.6, 0.7, 0.8, 0.9, and 1.0. As a result, the processing system 100 can define coarser quantile cuts earlier in the distribution (e.g., a 0.0 to 0.5 cut) and more granular cuts towards the end of the distribution (e.g., finer cuts between 0.5 and 1.0). In the above example, different quantile binning strategies are used for the distribution of request size features 302 and the distribution of service time features 304.

In some examples, the distribution of request size features 302 can be used as the collection of request size tokens 110 of FIG. 1, and a distribution of service time features with the modified quantile cuts can be used as the collection of service time tokens 112 of FIG. 1.

The quantile ratios may be provided as input from an individual, for example, an administrator, or may be based on an automated analysis implemented by the processing system 100. For example, the processing system 100 may parse the sorted array of amount values to determine the maximum and the minimum values. Based on the maximum and minimum values, the processing system 100 may determine the ratios for implementing the quantile cuts.

Note further that each of the distribution of request size features 302 and the distribution of service time features 304 uses bounded amount values, unlike the unbounded amount values of the histograms 104 and 106. Thus, each "request size feature" in a corresponding quantile of the distribution of request size features 302 is represented by a bounded amount value, and each "service time feature" in a corresponding quantile of the distribution of service time features 304 is represented by a bounded amount value.

Figure 4:
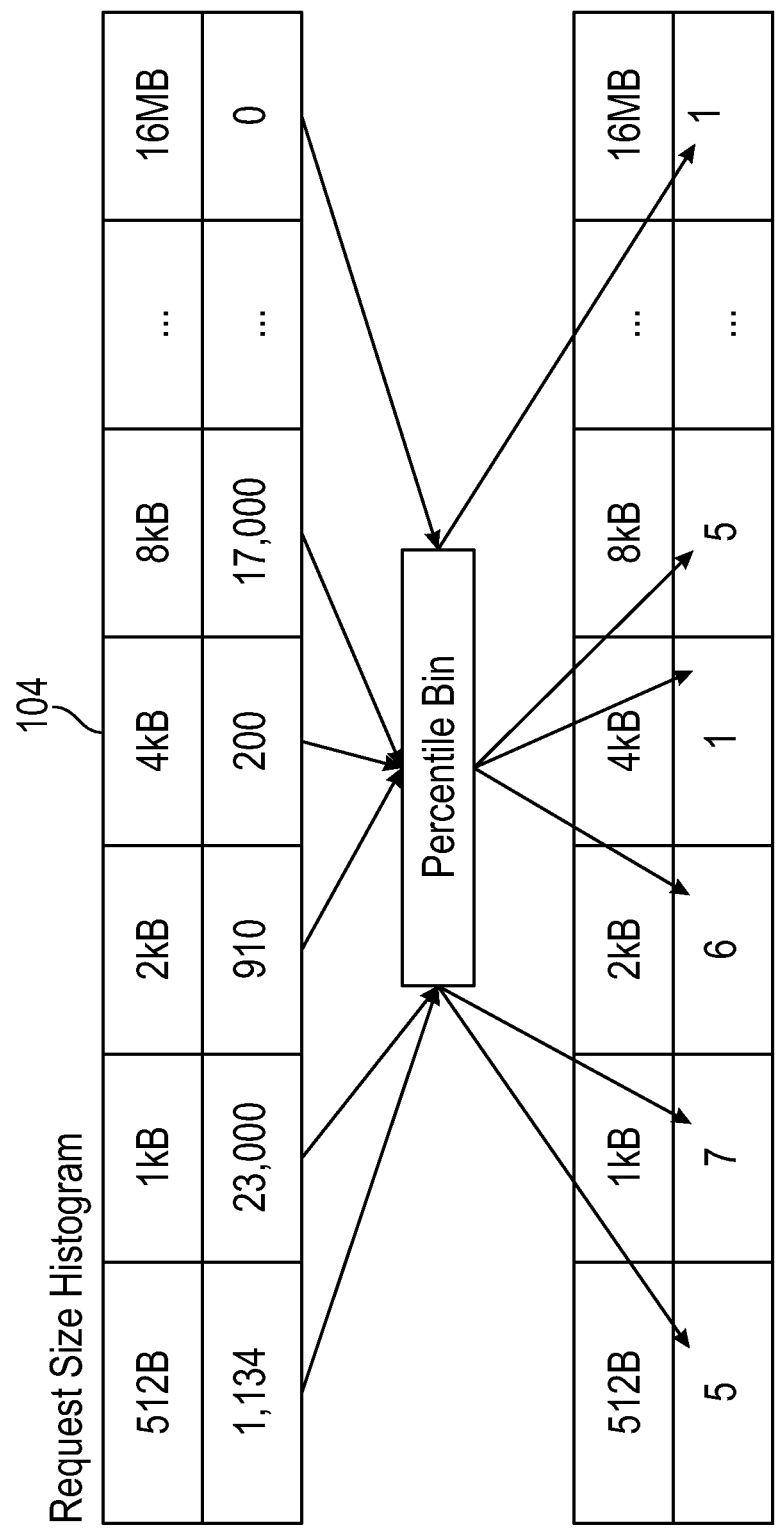
FIG. 4 is a block diagram illustrating percentile binning to derive discrete values for bins of a request size histogram, according to some examples.

In some examples, the processing system 100 can apply percentile binning to derive the bounded amount values for each distribution 302 or 304. FIG. 4 shows an example of an application of percentile binning to obtain the range of bounded amount values for the respective bins of the request size histogram 104. In the example of FIG. 4, the amount value 1,134 for the 512B bin is mapped to the bounded amount value 5, the amount value 23,000 for the 1 kB bin is mapped to the bounded amount value 7, the amount value 910 for the 2 kB bin is mapped to the bounded amount value 6, and so forth.

In the example of FIG. 3, the bounded amount values for the distribution of request size features 302 ranges from 0 to 14, and the bounded amount values for the distribution of time features 304 ranges from 0 to 14. In other examples, the distribution of request size features 302 and the distribution of time features 304 can use different ranges of bounded amount values. The bounded amount values derived from percentile binning are used as the bounded values for the collections of tokens (110 and 112) used by the transformer model 102.

Note that the binning strategies used are dynamic depend upon specific values of histograms, which can differ for different storage systems.

The above transforms inputs (e.g., the histograms 104 and 108 of FIG. 1) from a continuous space to a discrete space (e.g., the collection of request size tokens 110 and the collection of service time tokens 112).

3. Transformer Model

The transformer model 102 computes a conditional probability distribution that estimates a probability of an output sequence conditioned on an input sequence. The conditional probability distribution includes probabilities associated with each output token predicted by the decoder 116.

As noted above, the service time tokens $(y_1, y_2, \ldots, y_t)$ of FIG. 1 are output tokens computed by the transformer model 102 one at a time. For each position j (j=1 to t), probabilities are computed for respective candidate service time tokens, and the candidate service time token with the highest probability is selected as the service time token $y_j$ at position j. The "candidate" service time tokens are all the possible service time tokens from the collection of service time tokens 112, which can be assigned as the service time token $y_j$ at each position j.

The transformer model 102 predicts the output tokens one at a time, given the entire input sequence (e.g., the collection of request size tokens 110) and the output tokens previously generated, based on use of the learned conditional probability below:

$$p(y) = \Pi_{t=1}^{T} p(y_t | \{y_1, y_2, \ldots, y_{t-1}\}, c), \quad \text{(Eq. 1)}$$

where y is the output token currently being calculated, and p(y) is the probability that is modeled as a joint conditional probability of all the output tokens $y_j$ conditioned on all previous output tokens, and context vectors c derived from the input tokens (the context vectors c is discussed further below).

In further examples, the learned conditional probability of Eq. 1 can be applied to score a probability between a given pair of input and output sequences, which can be used to detect anomalies in the distribution of the service times given the request size features (or other workload features).

Note that amount values in a bin of a histogram (e.g., 104 or 106) has a positional importance but not a temporal importance, e.g., the amount value in the 128 kb bin of the request size histogram 104 does not affect the relationship between the amount value in the 64k bin and the service time bins.

4. Attention Function

Figure 5:
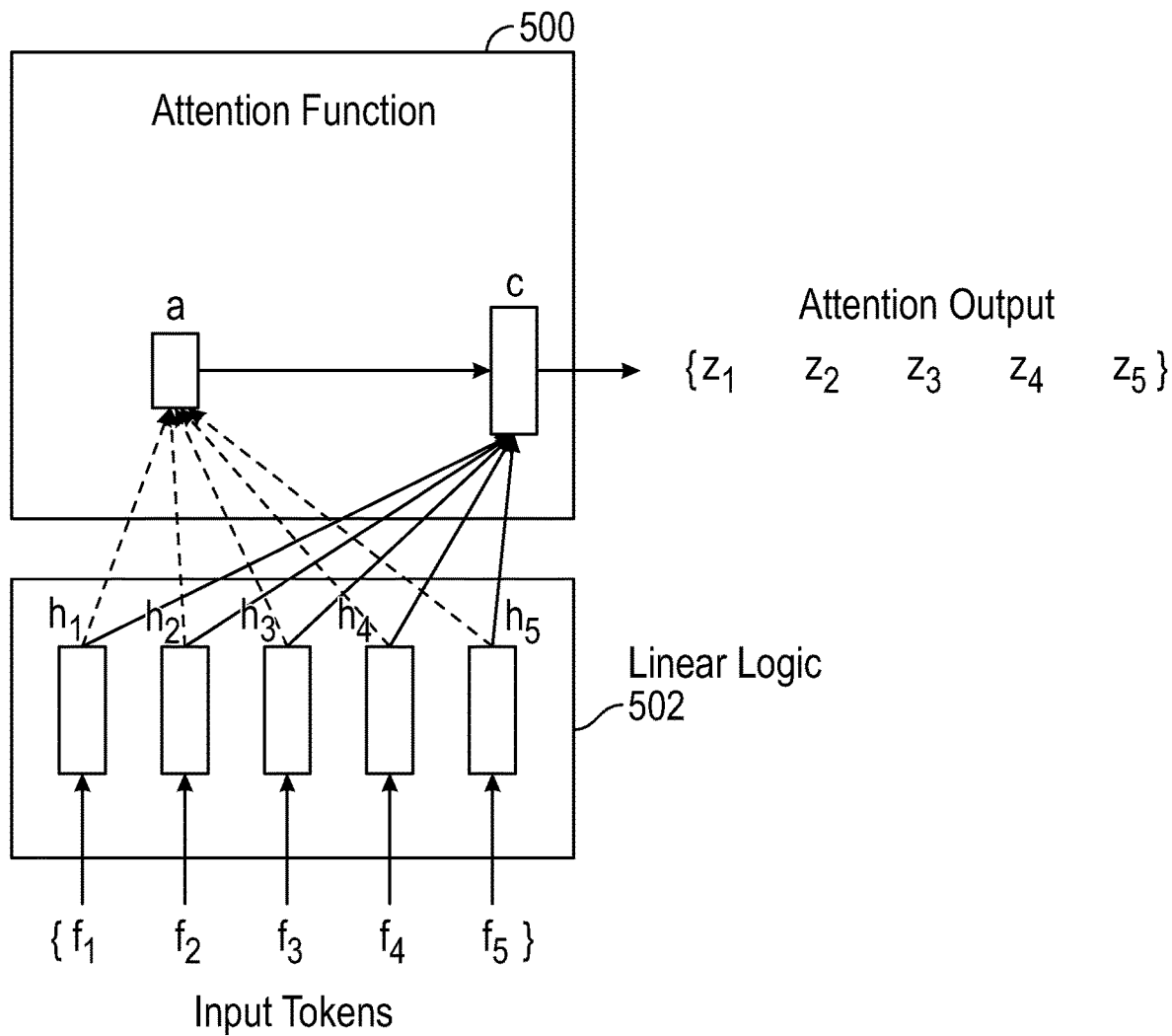
FIG. 5 is a block diagram of an example attention function, according to some examples.

FIG. 5 is a block diagram of an attention function 500 and a linear logic 502. The attention function 500 can be used to implement each of the self-attention logic 120, the self-attention logic 126, and the attention logic 128 of FIG. 1. The linear logic 502 can be used to implement each of the linear logic 118 and 124 in FIG. 1.

The linear logic 502 receives input tokens $f_1, f_2, f_3, f_4, f_5$. Although FIG. 5 shows an example with five input tokens, in other examples, a different number of input tokens is used.

For the linear logic 118 in the encoder 114 of FIG. 1, the input tokens are the request size tokens $x_1, x_2, \ldots, x_r$. For the linear logic 124 in the decoder 116, the input tokens are the feedback service time tokens $(y_1, \ldots)$ generated so far. The linear logic 502 transforms the input tokens $f_1, f_2, f_3, f_4, f_5$ into a collection of internal vectors $h_1, h_2, h_3, h_4, h_5$.

Note that the attention function 128 of FIG. 1 is not associated with a linear logic, since the output of the encoder 114 and the self-attention logic 126 are already in vector form. The input to the attention logic 128 in the decoder 116 includes the vectors output by the encoder 114 and the vectors output by the self-attention logic 126.

The output of the attention function 500 is a collection of output vectors $z_1, z_2, z_3, z_4, z_5$.

In some examples, the linear logic 502 applies an embedding algorithm to the input tokens $f_1, f_2, f_3, f_4, f_5$. Each input token is transformed by the embedding algorithm to a vector of real numbers. Each vector produced by the embedding algorithm has a fixed size.

The attention function 500 applies a query, key, and value operation such that if the query aligns with a key, the corresponding value is returned.

From each internal vector $h_k$ (k=1 to 5) of the internal vectors $h_1, h_2, h_3, h_4, h_5$, the attention function 500 creates a query vector $q_k$, a key vector $k_k$, and a value vector $v_k$, such that query vectors $(q_1, q_2, q_3, q_4, q_5)$, key vectors $(k_1, k_2, k_3, k_4, k_5)$, and value vectors $(v_1, v_2, v_3, v_4, v_5)$ are created. The attention function 500 can create the query vectors, the key vectors, and the value vectors by multiplying the internal vectors $h_1$, $h_2$, $h_3$, $h_4$, $h_5$ by three parameter matrices $W^Q$, $W^K$, and $W^V$ generated during the training of the transformer model 102. More specifically, multiplying $h_k$ by $W^Q$ produces $q_k$, multiplying $h_k$ by $W^K$ produces $k_k$, and multiplying $h_k$ by $W^V$ produces $v_k$.

The parameter matrices $W^Q$, $W^K$, and $W^V$ are updated by a feed forward neural network (e.g., 122 or 130 in FIG. 1) during training of the transformer model 102.

The attention function 500 aligns the query (or more specifically, the query vector) and the key (or more specifically, the key vector) and outputs a respective value (or more specifically, the value vector). If the attention function 500 is applying self-attention, the alignment is between interval vectors from the same collection of internal vectors.

However, for the attention function 128 of FIG. 1, the alignment is between the query vectors corresponding to output vectors from the encoder 114, and the key vectors corresponding to output vectors from the self-attention logic 126 in the decoder 116.

If a query aligns with more than one key, the weighted average of the values is returned, weighted by the alignment scores. For example, if $h_4$ is aligned strongly to $h_1$ and $h_5$, the output for $h_4$ generated by the attention function 500 is a weighted average of results for $h_1$ and $h_2$ based on alignment weights computed by the attention function 500.

Once the query vectors, key vectors, and value vectors have been derived, the attention function 500 computes a score for each internal vector $h_k$. For example, if a score is being calculated for $h_2$, then each other internal vector $h_1$, $h_3$, $h_4$, and $h_5$ is scored against $h_2$. The score is calculated by taking the dot product of the query vector with the key vector of the respective internal vector being scored. The scores for $h_1$ are computed by taking the dot product of $q_1$ and $k_1$, the scores for $h_2$ are computed by taking the dot product of $q_2$ and $k_2$, and so forth. The scores for each internal vector $h_m$ is in the form of a score vector that includes multiple scores (which score $h_m$ relative to the other internal vectors).

Next, the attention function 500 divides the scores in the score vectors by a scaling factor, e.g., the square root of the dimension of the key vectors, or another scaling factor. The scaling provides scaled score vectors ($ssv_1$, $ssv_2$, $ssv_3$, $ssv_4$, and $ssv_5$) for the respective internal vectors $h_1$, $h_2$, $h_3$, $h_4$, and $h_5$. The scaled score vector $ssv_1$ contains scaled scores for $h_1$, the scaled score vector $ssv_2$ contains scaled scores for $h_2$, and so forth.

Next, a weighting function is applied to the scaled scores in the scaled score vectors, as follows, to produce respective weights $\alpha_{mk}$ (where m=1 to 5, and k=1 to 5):

$$\alpha_{mk} = \frac{\exp(e_{mk})}{\sum_{k=1}^{T_x} \exp(e_{mk})}, \quad \text{(Eq. 2)}$$

where $e_{mk}$ is a similarity score (produced by a similarity function applied on the scaled score vectors discussed above) representing a similarity between $h_m$ and $h_k$ and $T_x$ is the length of the input tokens (which is 5 in the example of FIG. 5). The function $\exp(e_{mk})$ is an exponential function that computes the exponent of $e_{mk}$.

Each weight $\alpha_{mk}$ reflects the importance of the internal vector $h_m$ with respect to the internal vector $h_k$ in generating the appropriate encoding and eventually generating an output token $y_j$.

The weights $\{\alpha_{11}, \alpha_{12}, \alpha_{13}, \alpha_{14}, \alpha_{15}\}$, $\{\alpha_{21}, \alpha_{22}, \alpha_{23}, \alpha_{24}, \alpha_{25}\}$, $\{\alpha_{31}, \alpha_{32}, \alpha_{33}, \alpha_{34}, \alpha_{35}\}$, $\{\alpha_{41}, \alpha_{42}, \alpha_{43}, \alpha_{44}, \alpha_{45}\}$, and $\{\alpha_{51}, \alpha_{52}, \alpha_{53}, \alpha_{54}, \alpha_{55}\}$ are used to populate an alignment model $\alpha$, which is shown in FIG. 5.

The weights in the alignment model a are then used to multiply with the value vectors $v_1$, $v_2$, $v_3$, $v_4$, $v_5$ to produce the entries of the context vectors c in FIG. 5. Specifically, $v_1$ is multiplied with each weight in $\{\alpha_{11}, \alpha_{12}, \alpha_{13}, \alpha_{14}, \alpha_{15}\}$ to produce $wv_{11}$, $wv_{12}$, $wv_{13}$, $wv_{14}$, and $wv_{15}$; $v_2$ is multiplied with each weight in $\{\alpha_{21}, \alpha_{22}, \alpha_{23}, \alpha_{24}, \alpha_{25}\}$ to produce $wv_{21}$, $wv_{22}$, $wv_{23}$, $wv_{24}$, and $wv_{25}$; $v_3$ is multiplied with each weight in $\{\alpha_{31}, \alpha_{32}, \alpha_{33}, \alpha_{34}, \alpha_{35}\}$ to produce $wv_{31}$, $wv_{32}$, $wv_{33}$, $wv_{34}$, and $wv_{35}$; $v_4$ is multiplied with each weight in $\{\alpha_{41}, \alpha_{42}, \alpha_{43}, \alpha_{44}, \alpha_{45}\}$ to produce $wv_{41}$, $wv_{42}$, $wv_{43}$, $wv_{44}$, and $wv_{45}$; and $v_5$ s multiplied with each weight in $\{\alpha_{51}, \alpha_{52}, \alpha_{53}, \alpha_{54}, \alpha_{55}\}$ to produce $wv_{51}$, $wv_{52}$, $wv_{53}$, $wv_{54}$, and $wv_{55}$.

Then, sums of the entries of the context vectors c are computed to derive attention vectors $z_1$, $z_2$, $z_3$, $z_4$, and $z_5$, which are the output of the attention function 500. Specifically, $z_1$ is the sum of $wv_{11}$, $wv_{12}$, $wv_{13}$, $wv_{14}$, and $wv_{15}$; $z_2$ is the sum of $wv_{21}$, $wv_{22}$, $wv_{23}$, $wv_{24}$, and $wv_{25}$; $z_3$ is the sum of $wv_{31}$, $wv_{32}$, $wv_{33}$, $wv_{34}$, and $wv_{35}$; $z_4$ is the sum of $wv_{41}$, $wv_{42}$, $wv_{43}$, $wv_{44}$, and $wv_{45}$; and $z_5$ is the sum of $wv_{51}$, $wv_{52}$, $wv_{53}$, $wv_{54}$, and $wv_{55}$.

While the attention function 500 applied in each of the self-attention logic 120 and 126 in FIG. 1 computes weights $\alpha_{mk}$ that specify relationships among internal vectors corresponding to a single collection of input tokens ($x_1$, $x_2$, ..., $x_r$ or $y_1$, $y_2$, ..., $y_t$), the attention function 500 applied in the attention logic 128 computes weights $\alpha_{mk}$ that specify relationships among vectors corresponding to two different outputs (the output of the encoder 114 and the output of the self-attention logic 126 in the decoder 116).

Thus, the weights $\alpha_{mk}$ produced by the attention function 500 are indicative of relationships between the input tokens and the output tokens, e.g., relationships between the request size tokens ($x_1$, $x_2$, ..., $x_r$) and the service time tokens $y_1$, $y_2$, ... $y_t$. The weights can indicate whether a relationship exists between an input token (e.g., $x_i$) and an output token ($y_j$) and the strength of that relationship. For example, if a weight representing a relationship between $x_i$ and $y_j$ exceeds a threshold, then that indicates that there is a relationship between $x_i$ and $y_j$, and further the strength of the relationship is indicated by the value of the weight (e.g., a higher weight value indicates a stronger relationship). If the representing the relationship between $x_i$ and $y_j$ is less than the threshold, then that indicates no relationship exists between $x_i$ and $y_j$.

The relationships between the input tokens and the output tokens can be presented in an output representation, such as a heatmap or other graphical representation, to allow a user to visualize relationships if any (e.g., indicated by different colors or different brightness or different numerical values) between the input tokens and the output tokens.

In this manner, the output of the transformer model 102 can be used to predict how service times would be distributed for a given distribution of request sizes. In addition, the weights specifying relationships between request sizes and service times can allow a user or other entity (a program or a machine) to determine what service times are expected given workloads for specific request sizes. In this way, the user or other entity can allocate appropriate resources in a storage system for the given workloads for specific request sizes, so that the storage system can execute the workloads while satisfying performance goals.

The output of the transformer model 102 can also be used in troubleshooting issues in a storage system. A user or other entity can compare actual service times of the storage system to expected service times produced by the transformer model 102 for specific request sizes, to determine whether anomalies are present in the storage system (e.g., the storage system is overburdened and performing poorly, a fault is present in a program or a hardware component, etc.). Alerts or other remediation actions can be taken to address the anomalies.

5. Examples

Figure 6:
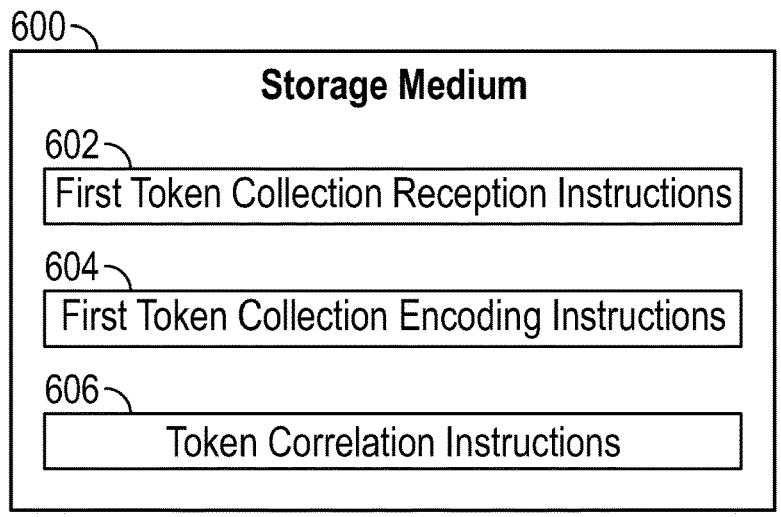
FIG. 6 is a block diagram of a storage medium storing machine-readable instructions, according to some examples.

FIG. 6 is a block diagram of a non-transitory machine-readable or computer-readable storage medium 600 storing machine-readable instructions that upon execution cause a system to perform various tasks. The system can include a computer or a collection of computers.

The machine-readable instructions include first token collection reception instructions 602 to receive a first collection of tokens relating to characteristics of workloads (e.g., sizes of I/O requests) for a computing system (e.g., a storage system, a computer system, a network system, etc.).

The machine-readable instructions include first token collection encoding instructions 604 to encode the first collection of tokens, the encoding including computing weights representing relationships among tokens of the first collection of tokens (e.g., such as by the self-attention logic 120 of FIG. 1), and generating a representation of the first collection of tokens based on the weights (e.g., where the representation of the first collection of tokens can be the output of the encoder 114 of FIG. 1).

The machine-readable instructions include token correlation instructions 606 to determine, based on the representation, a correlation between the first collection of tokens and a second collection of tokens relating to elapsed times in executing the workloads. The correlation can be performed by the decoder 116 of FIG. 1, for example.

In some examples, a transformer model is used to recursively generate tokens of the second collection of tokens and feedback generated tokens of the second collection of tokens as inputs to the transformer model.

In some examples, the transformer model outputs a probability of each token of the second collection of tokens given the first collection of tokens and any previously generated tokens of the second collection of tokens.

In some examples, the weights are computed based on application of a self-attention function to the first collection of tokens, where the self-attention function computes the weights based on aligning respective pairs of tokens of the first collection of tokens.

In some examples, the self-attention function aligns the respective pairs of tokens based on use of parameter matrices (e.g., $W^Q$, $W^K$, and $W^V$) trained using a training data set.

In some examples, self-attention function computes a product of the weights with values (e.g., the value vectors $v_k$) produced from the aligning of the respective pairs of tokens.

In some examples, the machine-readable instructions indicate, based on weights representing the relationships among the tokens of first collection of tokens and the tokens of the second collection of tokens, strengths of relationships between the elapsed times represented by the second collection of tokens and the characteristics of the workloads represented by the first collection of tokens.

In some examples, different values of the weights indicate different strengths of the relationships between the elapsed times represented by the second collection of tokens and the characteristics of the workloads represented by the first collection of tokens.

Figure 7:
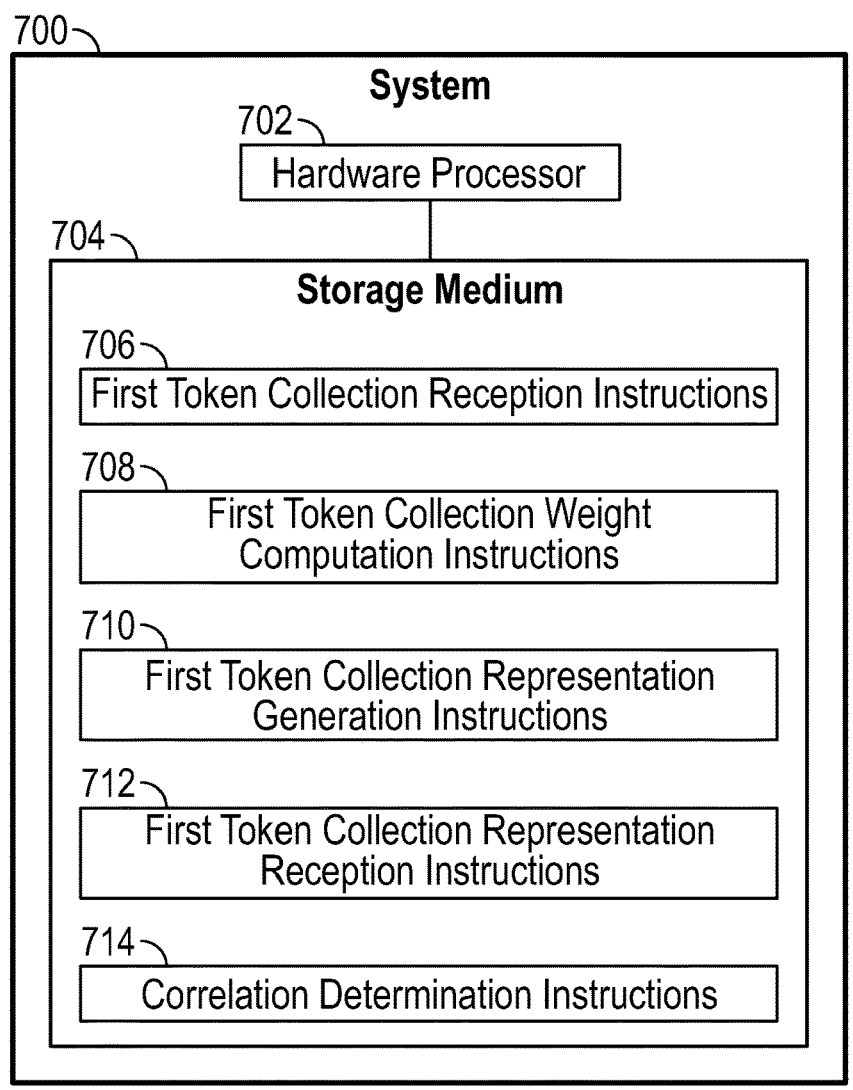
FIG. 7 is a block diagram of a system according to some examples.

FIG. 7 is a block diagram of a system 700 (e.g., a computer or a collection of computers).

The system 700 includes a hardware processor 702 (or multiple hardware processors). A hardware processor can include a microprocessor, a core of a multi-core microprocessor, a microcontroller, a programmable integrated circuit, a programmable gate array, or another hardware processing circuit.

The system 700 includes a non-transitory storage medium 704 storing machine-readable instructions executable on the hardware processor 702 to perform various tasks. Machine-readable instructions executable on a hardware processor can refer to the instructions executable on a single hardware processor or the instructions executable on multiple hardware processors.

The machine-readable instructions in the storage medium 704 include first token collection reception instructions 706 to receive, at an encoder, a first collection of tokens relating to characteristics of requests that produce workloads for a computing system.

The machine-readable instructions in the storage medium 704 include first token collection weight computation instructions 708 to compute, using the encoder, weights representing relationships among tokens of the first collection of tokens.

The machine-readable instructions in the storage medium 704 include first token collection representation generation instructions 710 to generate, with the encoder, a representation of the first collection of tokens based on the weights.

The machine-readable instructions in the storage medium 704 include first token collection representation reception instructions 712 to receive, at a decoder from the encoder, the representation of the first collection of tokens.

The machine-readable instructions in the storage medium 704 include correlation determination instructions 714 to determine, at the decoder based on the representation, a correlation between the first collection of tokens and a second collection of tokens relating to elapsed times in executing the workloads.

In some examples, each of the encoder and the decoder comprises a neural network that is trained using training data.

Figure 8:
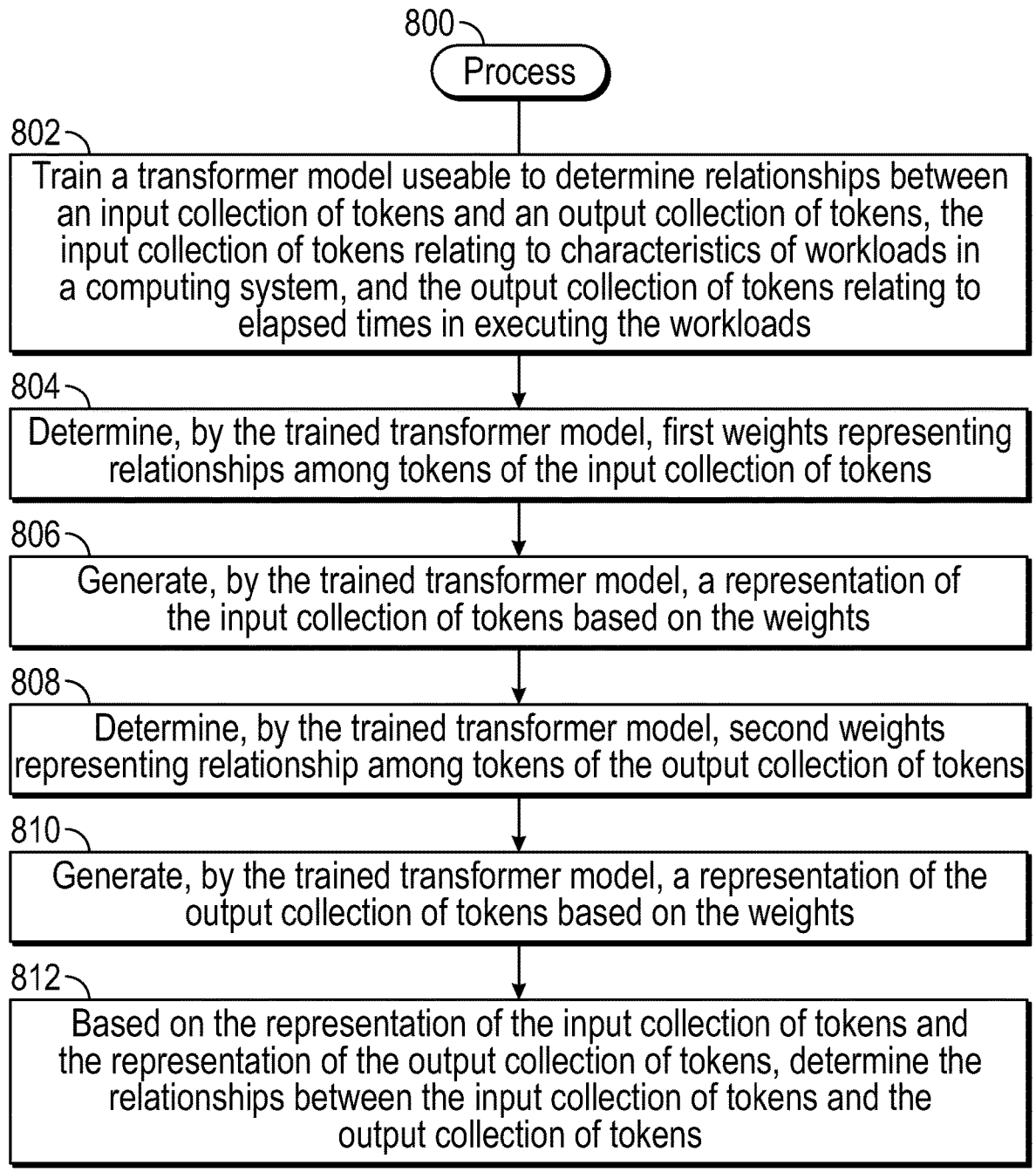
FIG. 8 is a flow diagram of a process according to some examples.

FIG. 8 is a flow diagram of a process 800 according to some examples.

The process 800 includes training (at 802) a transformer model useable to determine relationships between an input collection of tokens and an output collection of tokens, the input collection of tokens relating to characteristics of workloads in a computing system, and the output collection of tokens relating to elapsed times in executing the workloads.

The process 800 includes determining (at 804), by the trained transformer model, first weights representing relationships among tokens of the input collection of tokens.

The process 800 includes generating (at 806), by the trained transformer model, a representation of the input collection of tokens based on the weights.

The process 800 includes determining (at 808), by the trained transformer model, second weights representing relationships among tokens of the output collection of tokens.

The process 800 includes generating (at 810), by the trained transformer model, a representation of the output collection of tokens based on the weights.

The process 800 includes, based on the representation of the input collection of tokens and the representation of the output collection of tokens, determining (at 812) the relationships between the input collection of tokens and the output collection of tokens.

A storage medium (e.g., 600 in FIG. 6 or 704 in FIG. 7) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:
   receive a first collection of tokens relating to characteristics of workloads for a computing system;
   encode the first collection of tokens to compute, based on application of a first self-attention function to the first collection of tokens, first weights representing relationships among tokens of the first collection of tokens, the first self-attention function to compute the first weights based on aligning respective pairs of tokens of the first collection of tokens;
   generate a representation of the first collection of tokens based on the first weights;
   apply a second self-attention function to a second collection of tokens to compute second weights representing relationships among tokens of the second collection of tokens, the second collection of tokens relating to elapsed times in executing the workloads;
   generate a representation of the second collection of tokens based on the second weights;
   apply an attention function based on the representation of the first collection of tokens and the representation of the second collection of tokens, to produce third weights representing relationships among tokens of the first collection of tokens and tokens of the second collection of tokens; and
   determine, based on the third weights, a correlation between the first collection of tokens and the second collection of tokens, the correlation comprising strengths of relationships between the elapsed times represented by the second collection of tokens and the characteristics of the workloads represented by the first collection of tokens.

2. The non-transitory machine-readable storage medium of claim 1, wherein the instructions to determine the correlation between the first collection of tokens and the second collection of tokens comprises instructions to determine that a request having a first characteristic represented in the first collection of tokens contributes to a first elapsed time represented in the second collection of tokens.

3. The non-transitory machine-readable storage medium of claim 1, wherein the first collection of tokens represents requests of different characteristics, the workloads being responsive to the requests of different characteristics.

4. The non-transitory machine-readable storage medium of claim 1, wherein the second collection of tokens represents different service times or latencies of operations in the workloads.

5. The non-transitory machine-readable storage medium of claim 1, wherein the instructions to apply the second self-attention function comprises instructions to feedback previously generated tokens of the second collection of tokens as inputs to the second self-attention function.

6. The non-transitory machine-readable storage medium of claim 5, wherein the first self-attention function, the second self-attention function, and the attention function are part of a transformer model that outputs a probability of each token of the second collection of tokens given the first collection of tokens and any previously generated tokens of the second collection of tokens.

7. The non-transitory machine-readable storage medium of claim 1, wherein the first self-attention function aligns the respective pairs of tokens of the first collection of tokens based on use of parameter matrices trained using a training data set.

8. The non-transitory machine-readable storage medium of claim 1, wherein the first self-attention function is part of an encoder, and the second self-attention function and the attention function are part of a decoder.

9. The non-transitory machine-readable storage medium of claim 8, wherein the first self-attention function computes a product of the first weights with values produced from the aligning of the respective pairs of tokens of the first collection of tokens.

10. The non-transitory machine-readable storage medium of claim 9, wherein an output of the attention function is provided to a feed forward neural network.

11. The non-transitory machine-readable storage medium of claim 1, wherein the characteristics of the workloads comprise sizes of input/output (I/O) requests related to the workloads.

12. The non-transitory machine-readable storage medium of claim 1, wherein different values of the third weights indicate different strengths of the relationships between the elapsed times represented by the second collection of tokens and the characteristics of the workloads represented by the first collection of tokens.

13. A system comprising:
    a processor; and
    a non-transitory storage medium storing instructions executable on the processor to:
    receive, at an encoder, a first collection of tokens relating to characteristics of requests that produce workloads for a computing system;
    compute, using the encoder based on application of a first self-attention function to the first collection of tokens, first weights representing relationships among tokens of the first collection of tokens, the first self-attention function to compute the first weights based on aligning respective pairs of tokens of the first collection of tokens;

generate, with the encoder, a representation of the first collection of tokens based on the first weights;

receive, at a decoder from the encoder, the representation of the first collection of tokens;

apply, at the decoder, a second self-attention function to a second collection of tokens to compute second weights representing relationships among tokens of the second collection of tokens, the second collection of tokens relating to elapsed times in executing the workloads;

generate, at the decoder, a representation of the second collection of tokens based on the second weights;

apply an attention function based on the representation of the first collection of tokens and the representation of the second collection of tokens, to produce third weights representing relationships among tokens of the first collection of tokens and tokens of the second collection of tokens; and determine, at the decoder based on the third weights, a correlation between the first collection of tokens and the second collection of tokens, the correlation comprising strengths of relationships between the elapsed times represented by the second collection of tokens and the characteristics of the workloads represented by the first collection of tokens.

14. The system of claim 13, wherein each of the encoder and the decoder comprises a neural network that is trained using training data.

15. A method comprising:

receiving, at a system comprising a hardware processor, a first collection of tokens relating to characteristics of workloads for a computing system;

encoding, by the system, the first collection of tokens to compute, based on application of a first self-attention function to the first collection of tokens, first weights representing relationships among tokens of the first collection of tokens, the first self-attention function to compute the first weights based on aligning respective pairs of tokens of the first collection of tokens;

generating, by the system, a representation of the first collection of tokens based on the first weights;

applying, by the system, a second self-attention function to a second collection of tokens to compute second weights representing relationships among tokens of the second collection of tokens, the second collection of tokens relating to elapsed times in executing the workloads;

generating, by the system, a representation of the second collection of tokens based on the second weights;

applying, by the system, an attention function based on the representation of the first collection of tokens and the representation of the second collection of tokens, to produce third weights representing relationships among tokens of the first collection of tokens and tokens of the second collection of tokens; and determining, by the system based on the third weights, a correlation between the first collection of tokens and the second collection of tokens, the correlation comprising strengths of relationships between the elapsed times represented by the second collection of tokens and the characteristics of the workloads represented by the first collection of tokens.

16. The method of claim 15, wherein the determining of the correlation between the first collection of tokens and the second collection of tokens comprises determining that a request having a first characteristic represented in the first collection of tokens contributes to a first elapsed time represented in the second collection of tokens.

17. The method of claim 15, wherein the first collection of tokens represents requests of different characteristics, the workloads being responsive to the requests of different characteristics.

18. The method of claim 15, wherein the applying of the second self-attention function comprises feeding back previously generated tokens of the second collection of tokens as inputs to the second self-attention function.

19. The method of claim 15, wherein different values of the third weights indicate different strengths of the relationships between the elapsed times represented by the second collection of tokens and the characteristics of the workloads represented by the first collection of tokens.

* * * * *